(12) United States Patent
Göbel

(10) Patent No.: US 8,435,155 B2
(45) Date of Patent: May 7, 2013

(54) OPERATING MECHANISM FOR A BICYCLE MULTIPLE GEAR HUB

(75) Inventor: Joachim Göbel, Prosselsheim (DE)

(73) Assignee: SRAM Deutschalnd GmbH (DE)

( * ) Notice: Subject to any disclaimer, the term of this patent is extended or adjusted under 35 U.S.C. 154(b) by 78 days.

(21) Appl. No.: 13/279,446

(22) Filed: Oct. 24, 2011

(65) Prior Publication Data

US 2012/0277054 A1    Nov. 1, 2012

(30) Foreign Application Priority Data

Oct. 23, 2010   (DE) .......................... 10 2010 049 438

(51) Int. Cl.
*F16H 3/44*    (2006.01)
(52) U.S. Cl.
USPC ........................................................ 475/297
(58) Field of Classification Search ............... 74/335
See application file for complete search history.

(56) References Cited

U.S. PATENT DOCUMENTS

| | | | |
|---|---|---|---|
| 5,078,664 | A | 1/1992 | Nagano |
| 5,556,354 | A | 9/1996 | Meier-Burkamp |
| 6,048,287 | A | 4/2000 | Rohloff |
| 6,258,005 | B1 | 7/2001 | Rohloff |
| 6,572,508 | B2 | 6/2003 | Shoge |
| 6,988,973 | B2 | 1/2006 | Steuer |

FOREIGN PATENT DOCUMENTS

| | | |
|---|---|---|
| DE | 19720794 | 5/1997 |
| DE | 10118645 | 4/2001 |
| DE | 102004048114 | 10/2004 |
| DE | 102005003056 | 1/2005 |
| EP | 0679569 | 1/1995 |
| EP | 0383350 | 7/1995 |
| EP | 0876952 | 11/1998 |

*Primary Examiner* — Dirk Wright
(74) *Attorney, Agent, or Firm* — Milan Milosevic; Lisa Serdynski; Steven Courtright

(57) ABSTRACT

An operating mechanism by which the linear movement of a gearshift cable is converted into a rotational movement of an operating sleeve and transmitted to the interior of a bicycle multispeed gear hub.

10 Claims, 4 Drawing Sheets

OPERATING MECHANISM FOR A BICYCLE MULTIPLE GEAR HUB

BACKGROUND OF THE INVENTION

The present invention is directed to an operating mechanism for rotary shift initiation and subsequent transmission of a shifting movement in a multiple gear hub with a planetary gear mechanism for providing multiple transmission stages.

A multispeed hub typically consists of at least one planetary gear mechanism with at least one sun gear, planet gears meshing with this sun gear of at least one set of planetary gears as well as at least one ring gear in contact with the planet gears, which is arranged around a fixed axle. The torque is transmitted over a sprocket wheel to a driver and further over one of several transmission paths of the planetary gear mechanism to the hub shell or casing. The selective control of the corresponding transmission path is carried out through coupling points and clutch actuation points, which can be rotated or displaced relative to the axle. The choice of speed is performed with a switch in the handlebar region and is transmitted to the multispeed hub, e.g., mechanically by means of a linear movement of a control cable. The shift movement corresponding to the chosen speed is initiated in the internal hub. Sometimes an axle shifting device is used, which is located at the end of the hub axle or between the sprocket wheel and the frame dropout.

Shift movements can be initiated linearly by means of pushing or pulling elements, or rotationally by means of swinging or rotational elements. The shifting operation is generally guided from the outside over the axle, or guided through the axle or another standing component into the internal hub.

In EP 0 876 952 B1 a shift movement is introduced into the inside of the gear hub by means of an articulating mechanism which is mounted on the hub axle from its free end towards the inside. Thereby, an outer shift movement of a control cable, running vertically to the middle axle of the hub axle, is converted into a linear movement of a switch rod, which can move inside a central hole in the hub axle. A switching block, which is guided in a slot running obliquely to the middle axle of the hub axle and transversely through the hub axle, moves together with the switching rod. A switch socket working together with the switching block forms a clutch activation component. In the prior art there are also articulating mechanisms which are mounted on the end of the hub axle in the form of so-called "axle switching devices." They are prone to defects because they protrude over the other components of the bicycle in the direction of the hub axle, and they are considered to be troublesome. Longitudinal bores and slots in axles are expensive to manufacture and lead to higher costs. Since no quick release can be used with a hub axle with a longitudinal bore, the assembly and disassembly of the gear hub on bicycle frames is only possible with tools.

In DE 10 2005 003 056 A1 a switching device with a linear switching movement is also shown. Thereby the switch cable is brought through an axially running opening in the bearing cone to an axial position between the sprocket wheel and the frame dropout, whereby the shift movement is transmitted to the hub gears. Thereby there is only a deflection of the shift movement from a direction perpendicular to the hub axle to a direction in the direction of the hub axle. A nut on the inner periphery of the bearing cone serves to receive the control cable, which also decreases friction on the control cable. A disadvantage to this solution is the fact that when the hub is mounted, a threaded end of the shift cable cannot be screwed in to the corresponding counterpart in the internal hub, or at least only with corresponding constructive arrangements.

A rotary initiation of the shift movement occurs in EP 0 679 569 B1 by means of a cable pulley mounted on the inside of the fixed cone, which is functionally connected with a large number of cam rings. A controlling movement causes a rotation of the cam rings, whereby each cam ring acts on a corresponding cam lever and whereby the pawl-controlled sun gears of the planet gear can be engaged or disengaged through further cam lever surfaces, catches and switch cam rods of the switching device. A determining problem of this switching device is that it consists of a whole series of individual parts and this is expensive to manufacture.

DE 10 2004 048 114 B4 describes the transfer of a rotary switching movement between the driver and the fixed cone. Hereby a switch casing rotationally mounted with regard to the hub axle is supported by a first ball bearing opposite the stationary fixed cone as well as by a second ball bearing opposite a rotating driver. The driver necessarily always rotates in the case of a driver movement, whereby frictional forces to the second ball bearing between the driver and the switch casing, which can drag the switch casing in one direction, cannot be completely excluded. This is disruptive with regard to setting the switch casing in the exact gear position.

In EP 0 383 350 the rotary movement of a cable reel is transferred to the internal hub via openings in the inner periphery of the fixed cone. The cross sections of the openings are executed in the form of segments of annuli around the hub axle, in which extensions of a gear shift casing move. Since the positions of the extensions for the various gears lie very close together, a very high degree of accuracy is required for the gear switching device, especially in the case of a large number of gears.

In DE 101 18 645 another example of an operating mechanism is shown.

SUMMARY OF THE INVENTION

An aspect of the invention is to create a simple device for introducing the gear shift or switch movement into the hub gears, which causes no problems with manufacturing costs and accuracy requirements even with a large number of gears, gear stages or ratios.

The invention relates to a novel configuration of a device for introducing and transferring the gear switch or gear shift movement into the bicycle gears. Hereby the switch movement is consistently introduced into the gear hub in a rotational way without reducing the angle of rotation, through a component which is fixed to the axle.

The invention has an object of introducing the switch movement through a cone or fixed cone, which serves as the inner ring for positioning the driver, into the hub. The cone, which for this reason is attached in a torque-proof manner to the hub axle, has through holes in a radial circumferential direction. The holes serve to position gear shafts which function as transmission elements and bring a rotational movement into the internal hub. Each gear shaft carries an inner and an outer cog wheel on the inner and outer axial ends of the shaft. The outer cog wheel is in direct contact with the operating sleeve, which rotates in response to a linear movement of the gearshift cable. The inner cog wheel on the inner end meshes with the teeth of a transmission shaft mounted on the internal hub casing and including a hollow shaft.

The gear shafts transfer a rotational switch movement through the fixed cone, as soon as they are admitted to the outer region of the fixed cone through the operating sleeve with a rotating movement. The operating sleeve fulfills the function of a ring gear and has tooth-like contours on the inside of the circumference, with which the cog wheels of the gear shafts mesh. The cog wheels on the gear shafts can be compared to planet gears. The fixed cone has the function of a planet gear carrier.

The switch movement transferred to the internal hub is rotationally transmitted through the inner cog wheels of the gear shaft to the transmission shaft. In this process the teeth of the planet gear mesh in the interior of the fixed cone with the tooth-shaped contour on the outer side of the circumference of the gear shaft and enable a corresponding rotation of the gear shaft, which is ultimately coupled with the gear shift device. The transmission shaft can also be understood as a sun gear.

Therefore, the switch device corresponds to a planetary stationary gear. The planet gears enable on the one hand the transmissions of a simple stationary gear, and on the other hand a coupled transmission with various numbers of teeth to the inner and outer planet gears.

The transmission shaft is coupled in a torque-proof manner with sleeves which are positioned in such a way that they can rotate around the hub axle and constitute form elements for controlling the pawls corresponding to the sun gears. In the preferred example of execution of the invention, pawls are provided on the sun gears. Such a pawl is brought actively into contact with the teeth on the inner periphery of the corresponding sun gear and prevents the sun gear from rotating in a reverse direction. In the opposite rotation of the sun gear with respect to the hub axle the pawl is run over; therefore no fixation takes place with respect to the hub axle. In a movement to control the pawl, in order to bring this pawl, which is in contact with the teeth, out of contact with the teeth, the pawl is pivoted around a point of rotation by means of the action of a control contour of a pawl control component, and the sun gear can rotate freely in both directions.

The geometrical configuration of the pawl makes it possible to minimize the power necessary to execute a control movement. Therefore the components of the operating mechanism which transmit the control movement can preferably be manufactured from a plastic material, which may be less hard than steel but can be more economically made into the desired form by means of injection molding.

The control contours for acting upon the pawls on several of the sun gears are mounted on coupling sleeves, which are arranged around the hub axle and rotated with respect to the hub axle.

The operating sleeve functions additionally as a covering on the front side of the gear hub. Thereby there is no more need for a sheathing in the outer area of the gear hub. A further advantage of the operating mechanism of the invention lies in the fact that it is not sensitive to outside influences, since it is mounted axially inside the dropout of the bicycle frame. Should the bicycle fall over to the side, damage is largely excluded, in contrast to an operating mechanism with an axle switching or shifting device that is stuck on the end of the hub axle, outside the dropout, which converts the control cable device in a direction oblique to the hub axle direction into the direction of the hub axle. Likewise, there is good accessibility to the operating sleeve and the cable groove on the outer periphery. The end of a control cable can simply be attached to the operating sleeve, for example by means of a cable end bottom. The shift cable need not be brought into the hub. If it is combined with a corresponding device for supporting the cable sheath, there is no need to adjust the control cable when the rear wheel is put back together after being taken apart for inspection, maintenance or because of a defect.

The operating mechanism is provided with a spring casing and a return spring, preferably constructed as a coil spring. The return spring is positioned in a free area in the spring casing and fixed on one end opposite the hub axle. When the gearshift cable slackens, the return spring sends the gear box back to the starting position.

These and other features and advantages of the present invention will be more fully understood from the following description of one or more embodiments of the invention, taken together with the accompanying drawings.

DETAILED DESCRIPTION OF THE PREFERRED EMBODIMENTS

Preferred embodiments of the invention will herein be described with reference to the drawings. It will be understood that the drawings and descriptions set out herein are provided for illustration only and do not limit the invention as defined by the claims appended hereto and any and all their equivalents.

Figure 1:
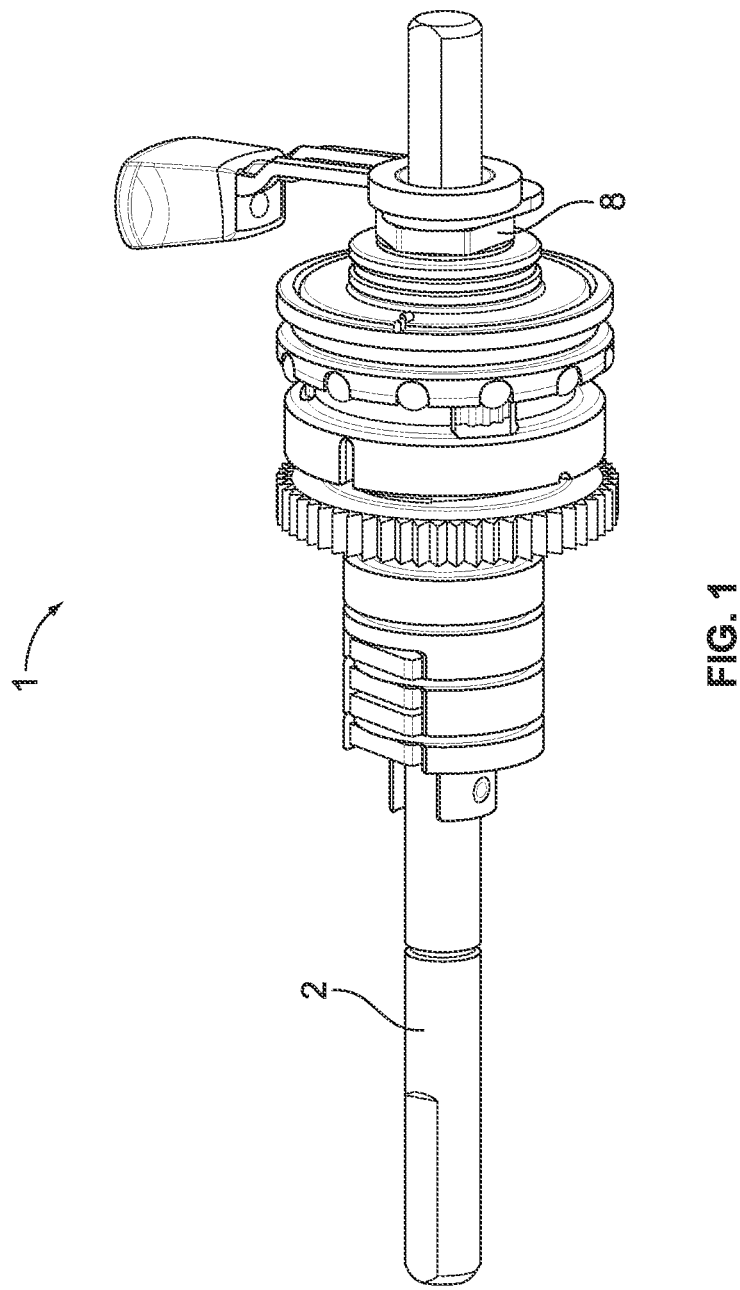
FIG. 1 shows a general view of the operating mechanism for a multispeed gear hub of the invention, mounted on, the axle of the hub.
Figure 2:
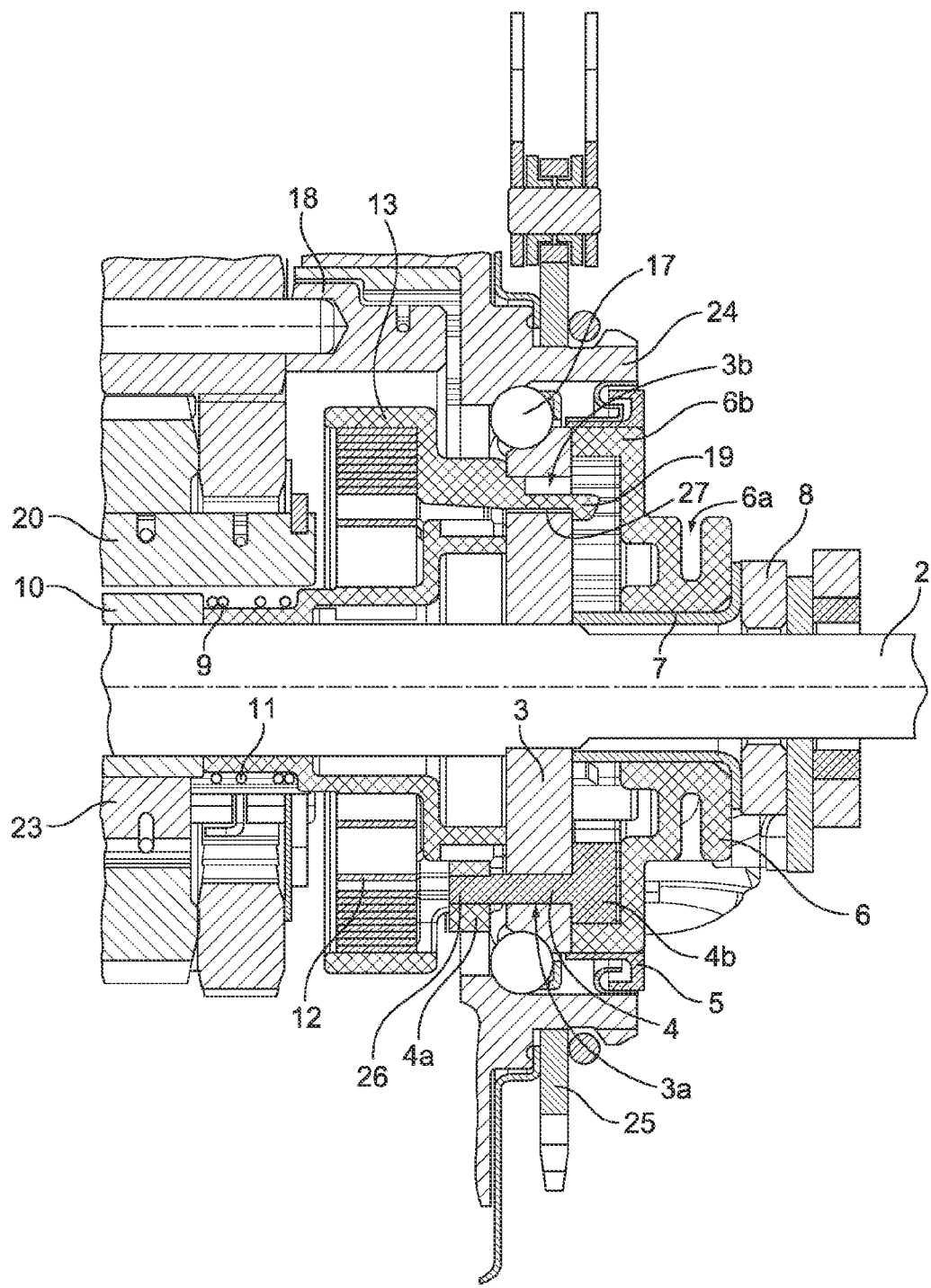
FIG. 2 shows a cross-sectional view of the operating mechanism of the invention in a multispeed gear hub.
Figure 3:
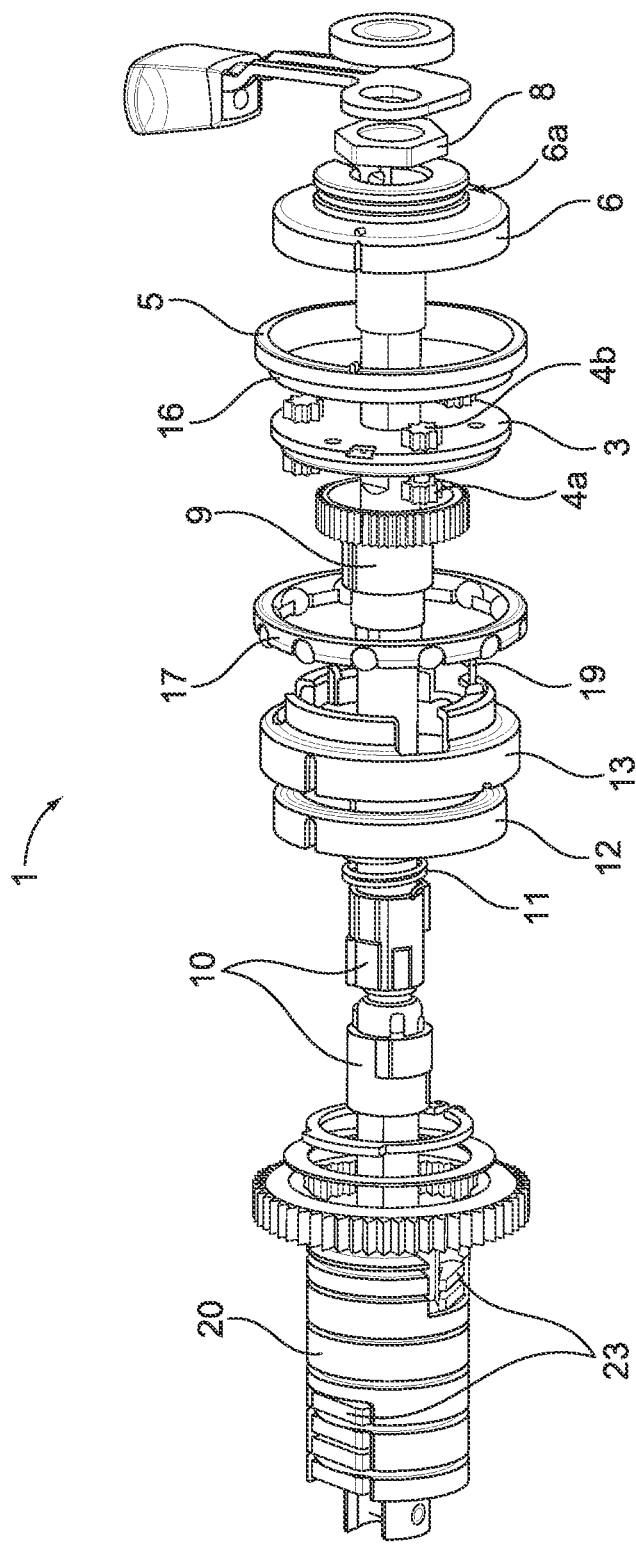
FIG. 3 is a representation of the main components of the operating mechanism, laid out in a line on the hub axle.
Figure 4:
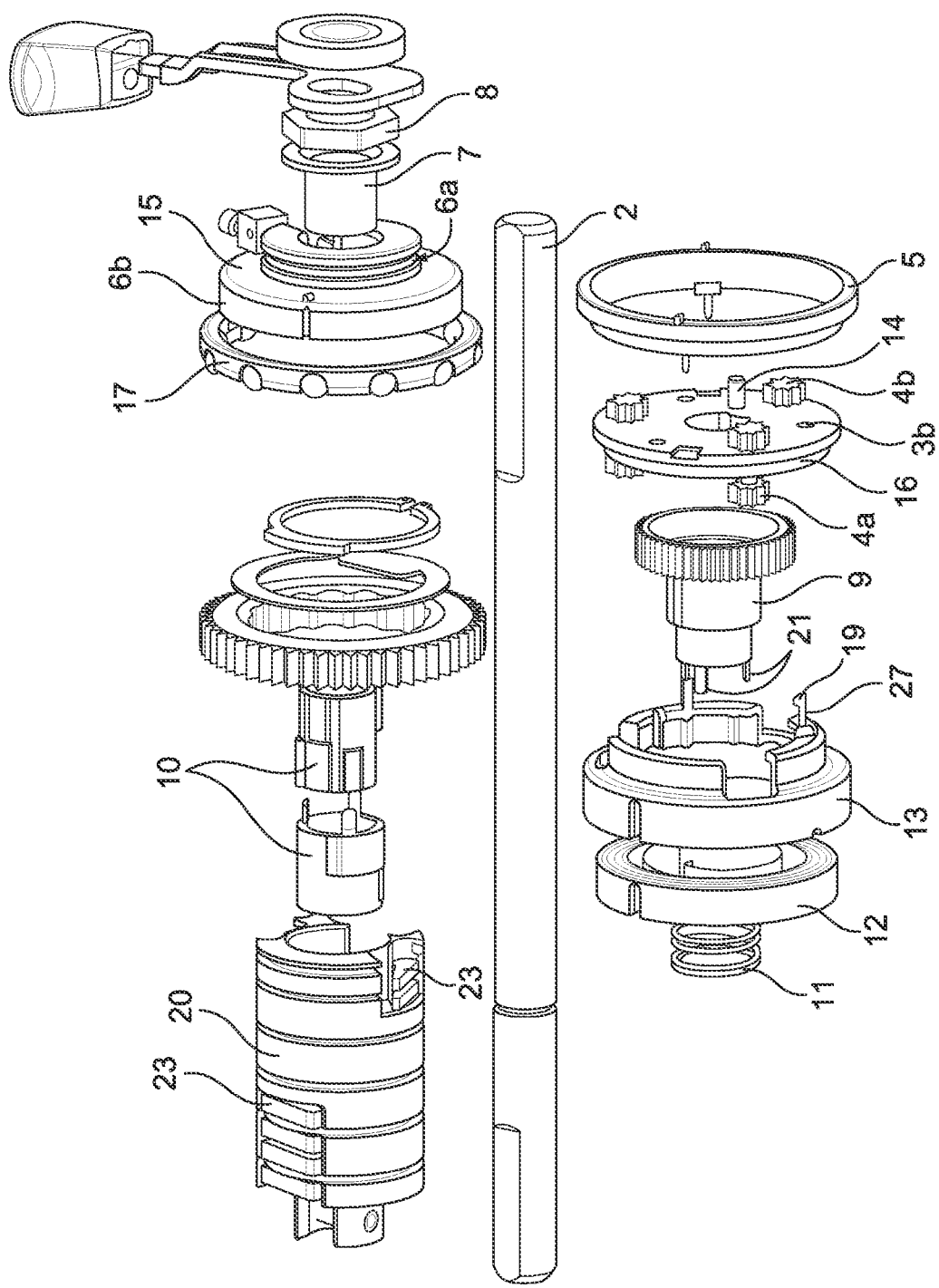
FIG. 4 is a detailed representation of the essential components of the operating, mechanism according to FIG. 3.

The components mounted on the axle of the hub axle of a cross sectional view of the operating mechanism according to the invention for a multispeed gear hub are represented generally in FIG. 1 and shown in detail in FIG. 2.

FIG. 2 shows a cross sectional view of the operating mechanism (1) for rotational switch introduction of a multispeed hub, which is arranged at the end concentrically around a hub axle (2). The operating mechanism (1) includes in detail a fixed cone (3), several gear shafts (4) each shaft with outer (4a) and inner cog wheels (4b), a sealing ring (5), an operating sleeve (6), a securing sleeve (7), an axle nut (8), a transmission shaft (9), a retaining spring (11), a spring casing (13) with a coil spring (12), a locking pin (14) and at least a two-part coupling sleeve (10).

On the hub axle (2) the cone (3) is fixed in place or locked in a torque-proof manner and axially secured by means of the securing sleeve (7) and an axle nut (8). On the securing sleeve (7) the operating sleeve (6) is positioned in such a way that it can be rotated but is axially fixed. Hereby the securing sleeve (7) fulfills two further functions: on the one hand it protects the operating sleeve (6) from axial slippage, and on the other hand it prevents the operating sleeve (6) from getting jammed in the fixed cone (3) when the axle nut is tightened.

On the outer diameter of the operating sleeve (6) there is a cable groove (6a) which receives the shift cable. In addition, the operating sleeve (6) has teeth (6b) on the axial end pointing toward the fixed cone (3), similar to a ring gear. The operating sleeve (6) rotationally transmits a switch movement through its rotation around the hub axle (2) and drives the operating mechanism. While the region of the cable groove (6a) is positioned radially outside of the operating sleeve (6), the section with the ring gear (6b) is located radially inside the operating sleeve (6). Between the outer circumference of the ring gear (6b) of the operating sleeve (6) and the inner circumference of the driver (24), a sealing ring (5) is installed for protection against dirt and moisture. Thereby the inside of the hub body or sleeve up to the planetary gear mechanism is sealed.

The operating sleeve (6) lies with its plane surface (15) flush alongside the circumference of the outer plane surface of the fixed cone (2). Here an additional sealing is provided with an O-ring between the two plane surfaces. Other sealing arrangements are also possible.

On the outer circumference of the fixed cone there is a ball bearing surface (16) for a ball bearing (17), which ensures the rotational position of the driver (24) in regard to the fixed cone (3).

In another form of execution, not shown in the figures, the teeth on the operating sleeve are provided not on the inner circumference side, but on the outer circumference side. The operating mechanism then no longer includes a stationary planetary gear.

As an alternative to an operating sleeve (6) with inner toothing which is rotated with a control cable with regard to the hub axle (2), a toothed rack could, for instance, also be provided.

As can be seen in FIGS. 1 and 2, the fixed cone (3) has a centrally located through hole, in which the hub axle (2) is placed. Around the central through hole there are three first through holes (3a), each at the same radial distance, to receive the gear shafts (4) and three second through holes (3b), to receive snap hooks (19) to secure the spring casing (13) on the fixed cone.

Three through holes (3a) for inserting the two-part gear shafts (4) have proven to be advantageous. Less than three first through holes (3a) mean less expenditure, but do not ensure optimal contact between outer cog wheel (4b) and ring gear (6b).

The two-part gear shafts (4) transmit a rotational movement of the ring gear operating sleeve (6) in an axial direction to the coupling sleeves (10), which are located radially in the area inside the sun gears of the planetary gearbox of the drive hub. The gear shafts (4) are positioned in such a way that they can be rotated in the first through holes (3a) of the fixed cone (3). In FIG. 2 a gear shaft (4) with an inner cog wheel (4a) and an outer cog wheel (4b) is shown in cross section. A first one-part component consists of the gear shaft (4) and the outer cog wheel (4b). The gear shaft (4) has a conical section (26) with a slight incline on the end opposite the outer cog wheel (4b). For mounting, the gear shaft (4) is introduced into the first through hole (3a), and after that the inner cog wheel (4a) is pressed onto the conical section. As a result of the influence of friction, no further security for the axial position of the inner cog wheel (4a) on the gear shaft (4) is necessary—on the one hand for coupling in the direction of rotation and on the other hand so that assembly can only be carried out in the correct angular position, the conical section (26) at the gear shaft (4) has a cross section that is not round.

The gear shaft (4) meshes with the inner cog wheel (4b) in the teeth of the transmission shaft (9) and drives these in the opposite direction of rotation.

The transmission shaft (9) is fixed to or, in other words is connected in a torque-proof way with the two-part coupling sleeve (10) by means of driving projections (21) which engage at the transmission shaft (9) in synchronization recesses. In the execution form displayed the teeth are arranged at the outer circumference of the transmission shaft (9), but teeth would also be possible on the inner circumference The driving projections (21) are encoded and can only be coupled in exactly one relative angular position with the transmission shaft (9). The encoding can be realized by various cross sections of the driving projections (21), by their position in the circumferential direction or in another way, and serves the purpose that the sleeve components and the transmission shaft cannot be set in the wrong position relative to each other at assembly.

An especially advantageous aspect of this invention is the fact that because of the special construction of sun gear pawls (23) fixing the sun gears with respect to the hub axle (2), the load on the components is so low that almost all the integrated components of the operating mechanism can be made from appropriate plastics. Only the fixed cone, on the ball bearing surface (16) of which the balls of the ball bearing (17) roll, the spring elements and the securing sleeve (7) wound up with the axle nut (8) must be made of other materials, e.g., of aluminum or steel, since these components are exposed to greater loads. Plastic parts are advantageous for manufacturing, which has a positive effect on the production costs and contributes to reducing the weight of the gear hub. In the execution form shown here, the invention is also provided with a return spring in the form of a coil spring (12), with which the transmission shaft (9) can be rotated back into the initial rotation position. The coil spring (12) engages on one end with the gear shaft (4) and on the other end with a slot in the spring casing (13). Thereby it is also radially secured to the outside. The hub axle (2) does not need it to be equipped with elements for receiving a spring end. In an alternative execution form, a spring end is fixed in a torque-proof manner to the hub axle (2), while the other spring end is fixed in a torque-proof manner to the inner circumference of the transmission shaft (9), and there is no separate spring casing. For further possible execution forms it is only important that the coupling sleeve (10) is rotated back by the power of the return spring (12) into the initial position.

The spring casing (13) is attached by means of snap hooks (19) in relation to the fixed cone (3), whereby each snap hook (19) engages with a second through hole (3b) on the fixed cone (3).

The snap hook is not necessarily designed for repeated assembly, a disassembly is not urgently necessary. A distance in an axial direction between the spring casing (13) and the fixed cone (3) is prescribed by the length of the snap hooks (19). In addition short sections of the snap hooks (19) formed as stud bolts (27) engage with the second through holes (3b).

The connection between the spring casing (13) and the fixed cone (3) could alternatively be done with stud bolts with the length of the second through holes (3b) in connection with screws.

A retaining spring (11) in the form of a compression spring is installed on the transmission shaft (9) between the coupling sleeve (10) and the transmission shaft (9). It presses the transmission shaft (9) in an axial direction to the fixed cone (3), and the coupling sleeve (10) together with a pawl sleeve (20) to a latch on the hub axle (2) which is not shown. It is thereby ensured that an axial play between the coupling sleeves (10) is prevented and that the coupling sleeves (10) are always exactly under the corresponding controlling sun gear pawls (23).

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. An operating mechanism on a hub axle of a multispeed hub with a multispeed gear mechanism on an inside of a hub that can be rotated on the hub axle for shifting the gears of the multispeed gear mechanism, which comprises:
- an operating sleeve which rotates in relation to the hub axle and is positioned concentrically around the hub axle;
- a cone that is fixedly mounted on the hub axle and is positioned axially between the multispeed gear mechanism and the operating sleeve, the cone including one or more first through hole formed therethrough;
- a gear shaft positioned in each of the one or more first through holes which transmits rotation of the operating sleeve through the fixed cone in the direction of the multispeed gear mechanism, each gear shaft including an inner end and an outer end;
- an inner cog wheel arranged on the inner end of the gear shaft and fixedly connected to the gear shaft; and
- an outer cog wheel arranged on and fixedly connected to the outer end of the gear shaft; whereby the gear shaft transmits a rotational movement from the operating sleeve through the cone into the inside of the hub sleeve in the direction of the multispeed gear mechanism.

2. An operating mechanism according to claim 1, including teeth formed on a first axial end of an inner periphery of the operating sleeve for operationally contacting the outer cog wheel, and
- a control cable received on an outer periphery of the operating sleeve.

3. An operating mechanism according to claim 1, wherein the operating sleeve has a bearing on the second end of its inner periphery for positioning the operating sleeve in relation to the hub axle.

4. An operating mechanism according to claim 1, wherein an axle nut, presses a securing sleeve that is fixed in relation to the hub axle and radially inside the operating sleeve in a direction axial to the cone.

5. An operating mechanism according to claim 1, wherein a transmission shaft in the form of a hollow shaft includes teeth on an outer periphery of one axial end in the shape of a sun gear that is in contact with the inner cog wheel; and
- the transmission shaft is fixedly connected on a second axial end thereof with a coupling sleeve.

6. An operating mechanism according to claim 1, wherein a return spring is placed between the coupling sleeve and the hub axle to provide a bias directed towards a starting position of the coupling sleeve.

7. An operating mechanism according to claim 5, wherein the coupling sleeve works together with at least one torque-proof pawl mounted opposite the hub axle in order to control sun gears of a planetary gear mechanism which can be locked in relation to the hub axle, and to engage or release them.

8. An operating mechanism according to claim 1, wherein the one or more gear shafts is a plurality of gear shafts arranged in the cone in a circle concentric to the central axle of the hub axle.

9. An operating mechanism according to claim 1, wherein the cone includes one or more second through holes formed therethrough, in each of which there is positioned a snap hook which fixes a spring casing axially opposite the cone.

10. An operating mechanism according to claim 6, wherein the return spring is a coil spring that is arranged with a radially outer end inside a spring casing and is connected by a radially inner end to a transmission shaft.

* * * * *